United States Patent Office 3,382,026
Patented May 7, 1968

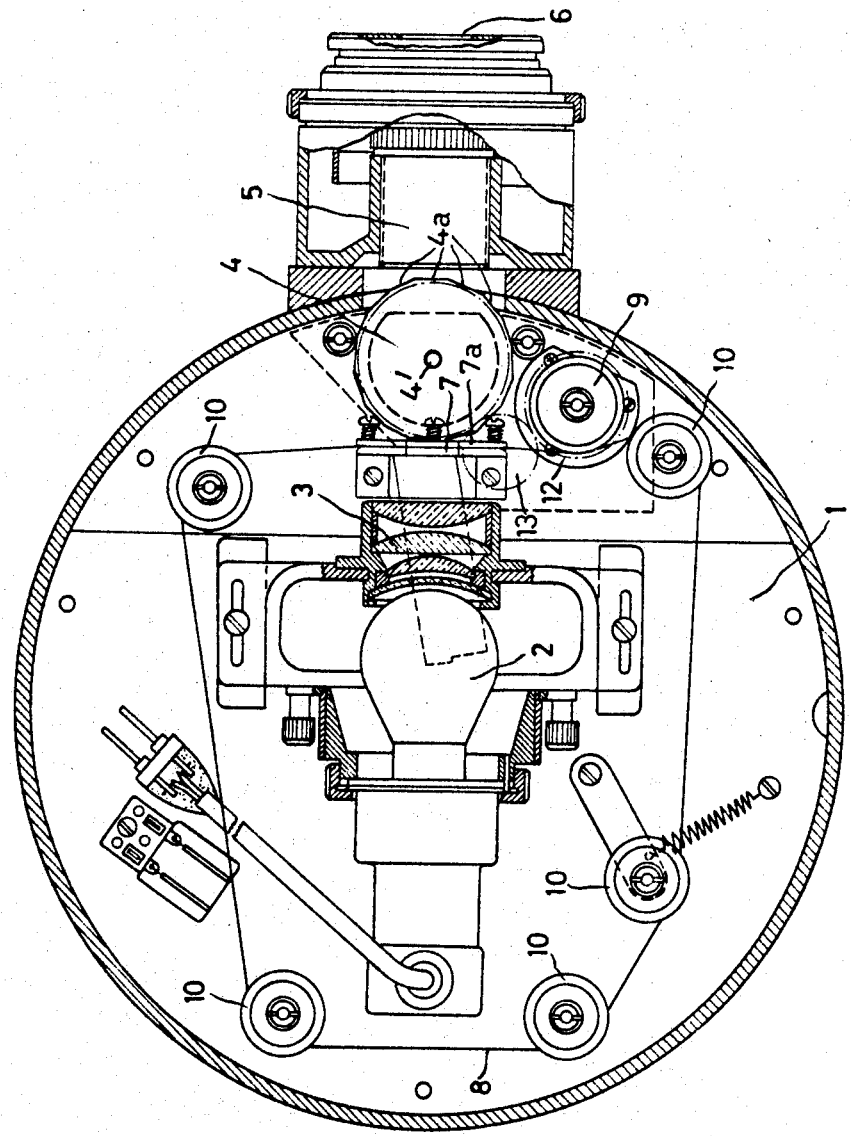

3,382,026
PROJECTOR FOR SLOWLY CHANGING PICTURES, PARTICULARLY FOR USE IN A PROJECTION-PLANETARIUM
Gerhard Schwesinger, Heidenheim (Brenz), and Kurt Schrumpf, Oberkochen, Germany, assignors to Carl Zeiss-Stiftung, doing business as Carl Zeiss, Wurttemberg (Brenz), Germany, a corporation of Germany
Filed June 25, 1965, Ser. No. 466,939
Claims priority, application Germany, June 27, 1964
Z 10,941
5 Claims. (Cl. 352—84)

ABSTRACT OF THE DISCLOSURE

A projector for exhibiting slowly changing pictures as used in a projection planetarium. A continuously operating drive mechanism moves a film representing a diffusely limited object which changes its size and/or brightness with an extremely low picture frequency through a film gate which is arranged between a condenser and a rotating polygon prism which latter is rotated in synchronism with the film. The polygon prism is arranged between the film gate and the projection objective. The picture window in the film gate is of double normal length in the direction of movement of the film, and a rectangular vignetting diaphragm is arranged in front of the projection objective, but the rotating shutter used in conventional projectors is omitted.

---

The invention relates to a projector for the special exhibition of slow movements and/or changes in brightness of diffusely limited objects, for example for the time-lapsing projection of a form-changing and brightness-changing comet in a planetarium. The projector is distinguished by simplicity, low consumption of film material and great quietness of operation.

In the slow-motion projection of moving objects, the customary procedure is to photograph the moving object with a high picture frequency and thereupon project the film carrying these pictures with a very much reduced picture frequency. This customary procedure requires, as is well known, extraordinarily great lengths of film. It has already been attempted to attain a greater quietness in the operation of moving picture projectors by means of the so-called optical image compensation during which the film is continuously moved over the aperture in a film gate, whereby the picture movement is optically compensated by a pivotal movement of a plane parallel plate in the path of the light rays of the projector. This is accomplished by means of a rotating circular symmetrical polygon prism, which in effect forms a combination of several plane parallel plates.

It is an object of the invention to employ the well known optical image compensation with a polygon prism, but differs from the customary arrangement by employing extraordinary low picture frequencies so that as a result also a low rotative speed for the polygon prism is used, which normally would not at all permit of a blending of the individual images for the eye, such as a flickerless fusion which, as is well known, requires approximately 50 picture changes per second. It was discovered, however, that in the manner as suggested in this invention the form- and brightness-changes of diffusely limited objects permit of quite an excellent showing, as the eye with these extremely low frequencies does not receive the impression of jerky or irregular changes in the picture content, as long as these changes are sufficiently small from one picture to the next one, and the projection arrangement, in contrast to the one employed in conventional cinematography, is arranged so that the exploited light current of the projection lamp is not temporarily changed by a shutter during the projection. The individual pictures are slowly and continuously moved one into the other by overlapping so that the sum of the two picture brightnesses remains constant.

For the exhibition of form-changing and brightness-changing celestial bodies such as a comet in a projection planetarium, the employment of picture frequencies of about one picture per second to one picture per 2½ seconds has given satisfactory results. Since such a picture frequency requires only an extraordinarily slow conveying speed of the film and also a slow rotational speed of the polygon prism, the result is an unusually great quietness of operation of the projection device and obviously only a very short length of film is required. These features render the projection device according to the invention particularly suitable for use in projection planetariums. Indeed, one requires for the exhibition of the growing and the passing of a comet only about $\frac{1}{10}$ of the film length which would be required when employing the conventional projection method.

The following feature is to be noted:

When the projected picture is limited in direction of movement of the film by a picture window of ordinary size in the film gate, the sharply defined edge of the picture window travels as a visible streak over the picture. This may be prevented by means of another feature of the invention, in that the size of the picture window is approximately doubled in direction of the film movement, and in that for the prevention of ghost images of the picture window edge the necessary limitation of the picture is attained with a vignetting rectangular diaphragm disposed in front of the projection objective. This diaphragm, in effect replaces the conventional picture window in the film gate. Furthermore, the amount of parallel adjustment of the path of rays attained by means of the polygon prism and to take place between the film and objective obviously has to be identical with the length of the film image taken in the direction of movement of the film. Therefore, with a given focal distance of the objective and a given projection distance, the maximum dimension of the image to be projected is determined.

This maximum attainable amount of parallel adjustment increases for the following three reasons:

(1) With the permissible angle of rotation of the prism for a single picture.
(2) With the index of refraction of the prism material.
(3) With the diameter of the polygon prism.

With the size of the angle of rotation, indeed, not much can be accomplished, because with an increasing angle of rotation, the picture errors increase to an appreciable degree which is greater than proportional. Accordingly, a predetermined maximum angle of rotation per individual picture cannot be exceeded. Therefore, a polygon prism with a relatively high number of surface is recommended. Satisfactory results have been attained with an objective whose back focal distance—that is the distance between the rear surface of the objective and the image plane within the film gate is 35 millimeter and a polygon prism having 16 surfaces.

With reference to the refraction index of the prism material, one may, however, through selection of a highly refractive glass, accomplish something worthwhile.

An appreciable advantage may be attained with a projection objective, whose back focal distance toward the film side is as large as possible in relation to its focal length and which is associated with a polygon prism, whose diameter is approximately equal to the mentioned back focal distance of the objective.

The invention consists therefore in the combination of a continuously operating drive mechanism for the film for producing picture frequencies far below the merging frequency, a gearing connected therewith for synchronously rotating a polygon prism and a vignetting rectangular diaphragm, with omission of the usual small picture window and the usual rotating shutter on the rear or inner end of the projection objective, The accompanying drawing illustrates an example of the projection device of the invention.

Referring to the drawing, which illustrates a sectional view of a projection device for a planetarium, a circular mounting plate 1 has mounted thereon the individual parts of the projector. The optical part of the projector consists of the source of light 2, the condenser 3, the polygon prism 4 rotating about an axis 4' extending at right angles to the optical axis, the projection objective 5, the back focal distance 5' of which is about 35 mm. disposed in front of the rotating prism 4 and the rectangular vignetting diaphragm 6 disposed in front of the objective 5. The film window 7 in the picture gate 7a is extended in the direction of travel of the film so as to be about twice of the conventional size. The film band 8 which is spliced together to form an endless loop is driven by a conveyor roller 9 and is threaded over a number of guide rollers 10. A not illustrated motor drives the conveyor roller 9 with a low speed and also drives by means of a gearing 12, 13 the polygon prism 4 in such a manner that the rotational frequency of the light deflecting prism surfaces 4a is equal to the picture frequency. The invention is not limited to the illustrated embodiment of the invention, but may find application in the projection of other objects with diffuse contours, among others, also for advertising purposes.

What we claim is:

1. In a projector for exhibiting slow motion and brightness changes of diffusely limited objects, particularly pictures of form-changing and brightness-changing celestial bodies in a planetarium, the combination comprising
    (a) a mounting plate having mounted thereon in spaced axial alignment,
    (b) a light source, a condenser and a projection objective,
    (c) a rotatably mounted polygon prism arranged between said condenser and said objective,
    (d) a film representing a diffusely limited object changing its form and brightness,
    (e) means forming a stationary film gate with a picture window therein of greater size in the direction of movement of said film than the height of the pictures on the films, said film gate being disposed between said condenser and said polygon prism,
    (f) means including a driven roller for conveying the film through said film gate at a uniform speed which is far below the merging picture frequency as it is used in conventional projectors,
    (g) a driven gearing for rotating said polygon prism in synchronism with said slow motion of said film, and
    (h) a rectangular vignetting diaphragm arranged a distance in front of said projection objective.

2. A projector according to claim 1, in which the diameter of said polygon prism is substantially equal to the back focal distance of said projection objective and is made of a high refractive glass.

3. A projector according to claim 1, in which said means including said driven roller causing said film to move with such a slow speed through said film gate that the individual pictures are slowly and continuously moved one into the other by overlapping so that the sum of the two picture brightnesses remains constant.

4. Projector for exhibiting slow motion and brightness changes of diffusely limited objects, particularly pictures of form-changing and brightness-changing celestial bodies in a planetarium comprising in combination:
    (a) a mounting plate having mounted thereon
    (b) means forming a film gate with a picture window therein of greater size in the direction of movement of the film than the height of the pictures on the film,
    (c) means including a driven roller for conveying the film through said film gate at a picture frequency of not more than one picture per second,
    (d) a projection objective,
    (e) a rotatably mounted polygon prism arranged between said film gate and said projection objective,
    (f) a driven gearing for rotating said polygon prism in synchronism with the movement of said film,
    (g) and a rectangular diaphragm arranged spaced in front of said projection objective.

5. Projector for exhibiting slow motion and brightness changes of diffusely limited objects, particularly pictures of form-changing and brightness-changing celestial bodies in a planetarium comprising in combination:
    (a) a mounting plate having mounted thereon.
    (b) means forming a film gate with a picture window therein of greater size in the direction of movement of the film than the height of the pictures on the film,
    (c) means including a driven roller for conveying the film through said film gate at a speed below the merging picture frequency,
    (d) a projection objective provided with a back focal distance which is as great as possible is relation to the focal length of said objective,
    (e) a rotatably mounted polygon prism arranged between said film gate and said projection objective.
    (f) a driven gearing for rotating said polygon prism in synchronism with the movement of said film,
    (g) and a rectangular disphragm arranged on the outer forward end of said projection objective.

References Cited

UNITED STATES PATENTS

| 1,646,341 | 10/1927 | Baradat | 352—119 |
| 2,013,661 | 9/1935 | Leventhal | 352—119 |
| 3,155,979 | 11/1964 | Mast et al. | 352—119 |

FOREIGN PATENTS

| 671,691 | 5/1952 | Great Britain. |
| 322,507 | 7/1920 | Germany. |

JULIA E. COINER, *Primary Examiner.*